Figure 2:
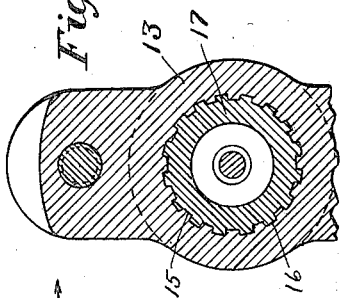

April 30, 1935.  A. V. D. WILLGOOS  1,999,267
GEAR REDUCTION UNIT
Filed Sept. 19, 1930

INVENTOR
A.V.D.Willgoos.
BY Joseph K. Schofield
ATTORNEY

Patented Apr. 30, 1935

1,999,267

UNITED STATES PATENT OFFICE 1,999,267

GEAR REDUCTION UNIT

Andrew V. D. Willgoos, West Hartford, Conn., assignor to Pratt & Whitney Aircraft Company, East Hartford, Conn., a corporation of Delaware Application September 19, 1930, Serial No. 483,018

6 Claims. (Cl. 74—411)

This invention relates to aircraft power plants and particularly to a speed reducing and driving connection between an aircraft engine and its propeller.

A primary object of the invention is to provide an improved driving connection between an engine crank shaft and the driving gear of a speed reducing mechanism.

A feature of importance of the invention is that the driving gear of the speed reducing unit for driving the propeller is a separate member from and is connected to the engine crank shaft in a manner permitting slight freedom of adjustment out of alignment therewith.

Another object of the invention is to provide the driving gear of a speed reducing unit with a bearing and a connection with a main driving shaft permitting adjustment thereof sufficient to enable the teeth of the driving gear to mesh properly with its driven gear, and prevent undue torsional and bending strains within the driving shaft and driving member or gear.

And finally it is a feature of importance of the invention to provide a splined connection between a driving member and a main driving shaft at one end of the driving member, the member being supported at an intermediate portion closely adjacent the gear teeth thereof so that the member may be slightly flexible relative to the crank shaft and will be permitted to adjust itself so that the tooth contact of the gears of the reduction unit may be made more uniform throughout their length.

With the above and other objects in view, my invention consists in the features of construction and operation set forth in the following specification and illustrated in the accompanying drawing.

In the accompanying drawing annexed hereto and forming a part of this specification, I have shown my invention embodied in an internal gear type speed reducing unit for aircraft power plants, but it will be understood that the invention may be otherwise embodied and that the drawing is not to be construed as defining or limiting the scope of the invention, the claims appended to this specification being relied upon for that purpose.

Figure 1:
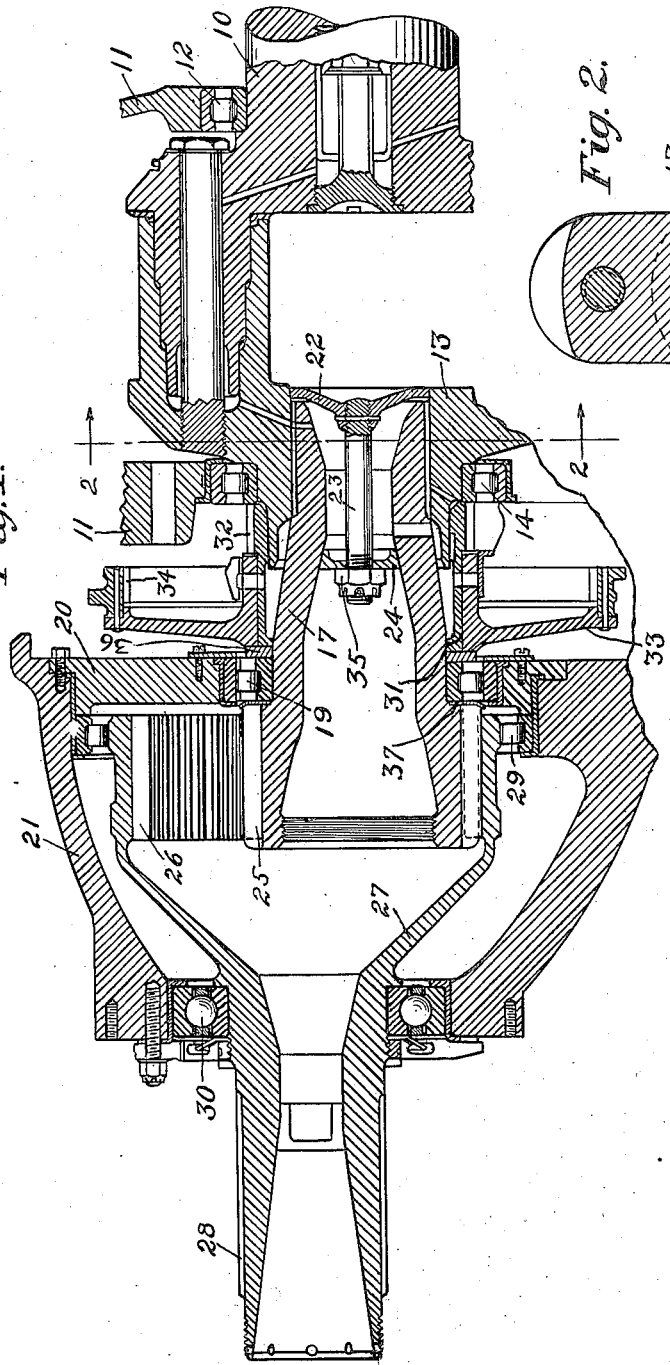

In the drawing:

Figure 1 is a longitudinal sectional view of a complete speed reducing unit embodying the present invention, and Fig. 2 is a cross sectional view of a portion of the device taken upon the line 2—2 of Fig. 1.

In the above mentioned drawing, I have shown but one embodiment of the invention which is now deemed preferable, but it is to be understood that changes and modifications may be made within the scope of the appended claims without departing from the spirit of the invention.

In the operation of aircraft, it is frequently essential for the efficient operation of an aircraft engine and its propeller to provide a speed reduction device between them. A conventional form of speed reduction device employs a pinion spur gear directly mounted upon and driven by the engine crank shaft. In mesh with this pinion gear is a larger gear which in the form shown is of the internal type. The present invention relates primarily to the construction and mounting of the pinion or driving member of a speed reducing unit and its connection with the driving shaft.

Referring more in detail to the figures of the drawing, the shaft 10 of an aircraft engine, shown fragmentarily within an engine frame 11, is provided with a bearing 12 within which the shaft 10 is supported. The shaft 10 is of a standard and well-known form so that further description of its construction will not be necessary. Connected to the shaft 10 is a crank member 13 supported within a bearing 14 aligned with bearing 12 housed within another portion of the frame 11.

The crank member 13 is provided with an axial opening, the internal surface of which is provided with longitudinally extending splines 15. Engaging these splines 15 are corresponding splines 16 on a member 17 extending axially from the end of the crank member 13. This member 17 is supported at an intermediate portion of its length by means of a bearing 19 mounted within an inwardly extending flange 20 attached at its periphery to a front housing 21 forming an extension of the engine frame 11. Slight freedom of movement angularly and rotatably of the member 17 relative to the crank member 13 is permitted by the interengagement of the splines 15 and 16. To retain the member 17 against axial movement relative to the crank member 13 a flange 22 is provided engaging against the inner ends of the splines 15. Permanently connected to this flange 22 is a bolt 23 retained in position by a collar 24 engaging against the wall of the opening extending through the member 17. A nut 35 on the outer end of bolt 23 enables the member 17 to be drawn into and retained in position relative to the crank member 13. The function of this construction of bolt 23 is to prevent separation of the members 13 and 17, and to permit slight flexibility of the members relative to each other. The member 17 is driven by the crank member 13 through the interengaging splines 15 and 16.

At the outer end of the member 17 are gear teeth 25 adapted to mesh with the teeth 26 of an internal gear forming the driven member 27 of a reduction gear. On the extended portion of this driven member 27 are splines 28 over which may be fitted the propeller hub. Bearings 29 and 30 rotatably support the driven member 27 within the housing 21.

Mounted upon the free end of the crank member 13 and keyed thereto is a sleeve 31. This sleeve 31 may extend to and have a bearing upon the periphery of the member 17 closely adjacent the bearing 19. On the sleeve 31 are gear teeth 32 for rotating the driving connections for a cam 33 rotatable upon the sleeve 31 and driven from internal gear teeth 34 adjacent its periphery.

From the above it will be seen that the member 17 is supported by its own bearing 19 independently from the crank members 10 and 13 and the driven member 27 so that it is uninfluenced by any torsional or bending deflections thereof. Also the member 17 is drivingly connected to the crank member 13 for rotation therewith by the interengaging splines 15 and 16. These splines permit a limited amount of flexibility so that the member 17 may adjust itself so that its teeth will properly mesh with the gear teeth 26 of the driven gear 27.

By drawing up the nut 35 on the bolt 23 to position the member 17 the sleeve 31 is held in position between a shoulder on the crank member 13 and a spacer 36. The inner race of the bearing 19 is also held properly positioned between the ends of the gear teeth 25 and the spacer 36. If desired a thin metal ring 37 may be inserted between the gear teeth 25 and the bearing 19 to protect the bearing 19 from foreign matter and too much lubricant entering the space between its races. The bolt 23 therefore not only retains in position the driving member 17 in a manner permitting limited adjustment, but also retains the sleeve 31, the spacer 36 and the bearing 19 in position thereon.

What I claim is:

1. A reduction gear comprising in combination, a frame member, a driving shaft rotatably mounted therein, a member mounted relatively to said driving shaft and extending axially therefrom, means extending co-axially within said member to retain said member in axial position relative to said driving shaft while permitting slight flexibility relative thereto, gear teeth on the extended end of said member, a support for said member between the gear teeth thereof and its attachment to said driving shaft, and a driven gear mounted adjacent said frame member and having teeth meshing with the teeth of said member.

2. A reduction gear comprising in combination, a frame member, a driving shaft rotatably mounted therein, a member splined to said driving shaft permitting flexibility relative thereto and extending axially therefrom, integral gear teeth forming a driving gear upon the extended end of said member, a driven gear meshing with said driving gear, and means to rotatably support said splined member intermediate its length and closely adjacent said driving gear, said driven gear being mounted within the frame member in which said splined member is mounted and separate from the frame member supporting the driving shaft.

3. A reduction gear comprising in combination, a frame member, a driving shaft rotatably mounted therein, a plurality of axially extending splines within said driving shaft, a member having splines interengaging the splines of said driving shaft and extending axially from said driving shaft, means extending co-axially within said member to said driving shaft but permitting limited flexibility thereof relative to said shaft, integral gear teeth on said member retaining said member, a driven gear engaging said gear teeth, a housing adjacent said frame member, and means to support the splined member and driven gear within said housing.

4. A flexible connection for a gear reduction comprising in combination, a driving shaft, a plurality of axially extending splines therein, a supporting bearing for said driving shaft, a member extending co-axially of said driving shaft and having a gear thereon, splines on said member loosely engaging the splines on said driving shaft, a driven gear engaging the gear on said flexibly mounted member, and a retaining means for said flexibly mounted member extending within said flexibly mounted member and driving shaft and having collars thereon engaging abutments on said driving shaft and on said flexibly mounted member.

5. A speed change device comprising in combination, a frame member, a driving shaft mounted therein, a member flexibly mounted within said driving shaft and extending therefrom, gear teeth thereon at its outer end, a support for said flexibly mounted member intermediate its length and independent of said driving shaft, a driven gear engaging the teeth on said flexibly mounted member, a sleeve rotatably supported upon adjacent portions of the driving shaft and flexibly mounted member, and rotatable members supported upon said sleeve.

6. A speed change device comprising in combination, a frame member, a driving shaft mounted therein, a member flexibly mounted within said driving shaft and extending therefrom, gear teeth thereon at its outer end, a support for said flexibly mounted member intermediate its length, a driven gear engaging the teeth on said flexibly mounted member, a sleeve surrounding the end of said driving shaft and supported thereon and on said flexibly mounted member adjacent its bearing, and rotatable members supported upon said sleeve.

ANDREW V. D. WILLGOOS.